United States Patent [19]
Haynes

[11] Patent Number: 5,241,988
[45] Date of Patent: Sep. 7, 1993

[54] QUICK OPENING AND CLOSING VALVE

[76] Inventor: Joel E. Haynes, 18316 Oxnard St., Tarzana, Calif. 91356

[21] Appl. No.: 685,971

[22] Filed: Apr. 15, 1991

Related U.S. Application Data

[63] Continuation of Ser. No. 409,136, Sep. 19, 1989, abandoned.

[51] Int. Cl.$^5$ .................... F16K 11/16; F16K 11/24
[52] U.S. Cl. .................... 137/607; 137/595; 251/44
[58] Field of Search .................... 137/607, 595, 489.3; 251/44, 45, 30.02, 30.05, 33

[56] References Cited

U.S. PATENT DOCUMENTS

| | | | |
|---|---|---|---|
| 641,009 | 1/1900 | Gulland | 251/44 X |
| 1,648,126 | 11/1927 | Hosmer | 137/607 |
| 2,213,748 | 9/1940 | Stettner | 137/607 |
| 2,672,157 | 3/1954 | Branson | 137/607 |
| 3,140,727 | 7/1964 | Cutler | 251/45 X |
| 3,300,175 | 1/1967 | Kozel | 251/45 X |
| 3,360,234 | 12/1967 | Thorburn | 251/44 |
| 4,009,860 | 3/1977 | Lingnau | 251/44 |
| 4,128,190 | 12/1978 | Gruber | 137/607 X |
| 4,201,362 | 5/1980 | Nishimi et al. | 251/44 X |
| 4,549,715 | 10/1985 | Engel | 251/44 X |
| 4,676,271 | 6/1981 | Fujikawa | 251/44 X |
| 4,972,874 | 11/1990 | Jackson | 251/30.05 X |

*Primary Examiner*—Stephen M. Hepperle
*Attorney, Agent, or Firm*—Poms, Smith, Lande & Rose

[57] ABSTRACT

The quick opening and closing valve of the present invention has a main chamber. An inlet from a source of liquid and an outlet extends into the chamber adjacent to and at right angles to each other. A ball or other type of plunger chamber moves (a) from a closed position seated on the outlet (b) to an open position spaced from the seat formed where the outlet and chamber meet. When the plunger is on the seat, the plunger blocks fluid flow from the inlet to the outlet, and the valve is closed. When the plunger moves off the seat, the inlet and outlet communicate so that fluid flows directly from the inlet to the outlet. A control port extends into the chamber on the other side of the plunger from the outlet. The control port is alternatively opened or closed by a control gate. When the control gate is in its closed position, the control port is closed. The pressure at the outlet is approximately atmospheric, but some fluid flows to the other side of the plunger which elevates the pressure there. The high pressure urges the plunger against the seat. Opening the control port drops pressure on that side of the plunger approximately to atmospheric. Because of the position of the inlet, the force of the fluid pushes the plunger away from the seat, and fluid then flows directly from the inlet to the outlet. Closing the control port builds pressure on the other side of the plunger from the outlet causing the plunger to move against the seat and close the valve. The present invention also discloses a mechanical system controlling the simultaneous opening and closing of two valves.

2 Claims, 2 Drawing Sheets

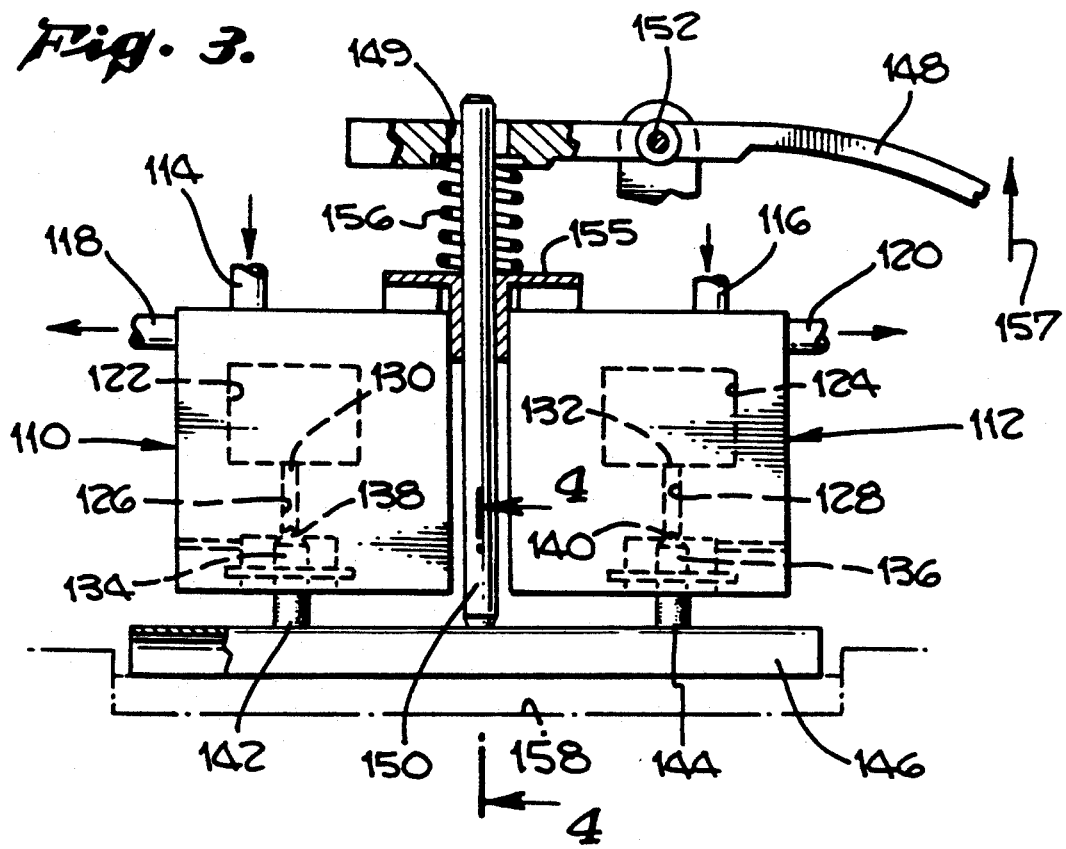
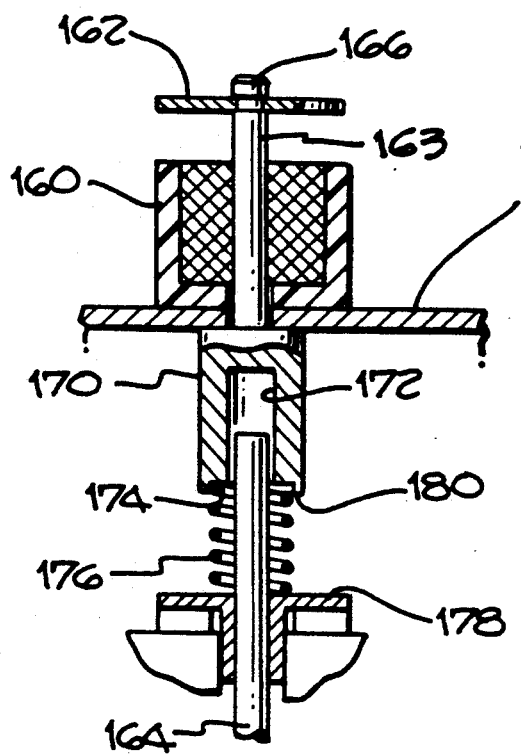
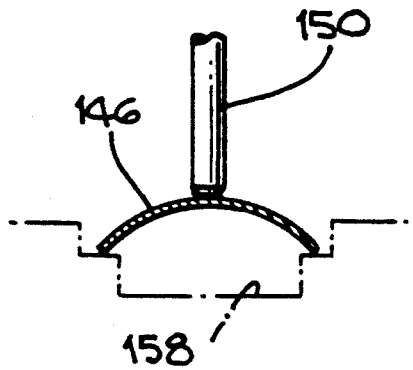

QUICK OPENING AND CLOSING VALVE

This is a continuation of copending application Ser. No. 07/409,136 filed on Sep. 19, 1989, now abandoned.

BACKGROUND OF THE INVENTION

1. Field of the Invention

The present invention relates primarily to valves, especially those used in post-mix beverage dispensers.

2. State of the Art

Post-mix beverage dispensers control the flow of two liquids in separate conduits. For most soft drinks, the liquid in one conduit is water saturated with carbon dioxide. Flavored syrup concentrate flows through the other conduit. Ideally, valves controlling the flow of the two components through the separate conduits open simultaneously. Flow regulators for each liquid maintain a fixed flow rate so that the components mix at the predetermined ratios. The conduits lead to a mixing chamber in which the two liquids combine just before or as they leave the valve system. When dispensing is complete both valves close, and fluid flow through both conduits stops.

To maintain proper flow for both components, the valves must be fully opened or fully closed. If either valve has some intermediate position, the valve system may dispense more of one component than the other. This results in the all too common watered down or too syrupy dispensed soft drink. Mechanical valves that do not immediately fully open and fully close are most subject to this problem. This is especially true when the person using the soft drink dispenser attempts to dispense small volumes of the soft drink to fill a cup to the top, a process called "teasing."

Present day dispensers usually use electrical solenoid valves. Electrically activated valves can be opened and closed simultaneously so that flow through both conduits start and stop together.

Solenoid valves generally exhibit high pressure loss and are expensive, however. In high pressure, high flow systems, the solenoid valves must be large enough to overcome system pressure so that they can close or open very fast. If the solenoid valves do not open or close very fast, there can be substantial flow while the valves are opening or closing. When flow occurs while either valve is partially open, the percentage of the two components in the final soft drink product may change. This is especially a problem when the valves are teased or opened and closed several times during the dispensing of one drink.

Brown, U.S. Pat. No. 4,266,726 (1981) and Fuerst, U.S. Pat. No. 3,540,476 (1970), are examples of beverage dispensers using solenoid valves.

Mechanical valves also exist. If mechanical valves are to have fully opened or fully closed positions and avoid intermediate, partial flow conditions, they usually have complicated over-center activation systems. These are usually quite costly to manufacture and require a high actuation force. These mechanical valves can be electrically activated, but the electrical activation is usually slow and has a relatively high power requirement. This is disadvantageous in a liquid dispenser because higher electrical power devices are more expensive and are not energy efficient.

Solenoid and mechanical valves currently in use today often require field adjustment. That is, a technician often must adjust the valves after they are installed to obtain optimum performance. The valves also require service. Additional service requirements are costly for the manufacturer and owner of beverage dispensers.

SUMMARY OF THE INVENTION

The present invention has as its objects disclosing and providing the following:

a. A mechanical valve which exhibits low actuation force.

b. A mechanical valve that is extremely fast acting to minimize the time during which the valve is not either fully opened or fully closed.

c. A beverage dispensing valve that exhibits low pressure loss through it.

d. A valve with actuation force that has no appreciably variations as inlet pressure changes.

e. A valve with snap action which has sufficient hysteresis to prevent teasing.

f. A valve which may be converted to electrical activation but which still retains its mechanical properties.

g. A valve which has a very low manufacturing cost.

h. Two or more valves in a system that open and close liquid conduits simultaneously.

The present invention meets these and other objects. The quick opening and closing valve of the present invention has a main chamber. An inlet, which is attached to a source of liquid, extends into the chamber. An outlet, which is attached to the outlet of the beverage dispenser, extends into the chamber. Preferably, the inlet and outlet extend through adjacent walls of the main chamber. The intersection of the outlet and the main chamber forms a seat.

A plunger in the chamber moves from a closed position on the seat to an open position spaced from the seat. When the plunger is on the seat, fluid does not flow from the inlet to the outlet, and the valve is closed. When the plunger is in the open position, the inlet and outlet communicate so that fluid flows directly from the inlet to the outlet through a small portion of the chamber.

A control port extends into the chamber on the other side of the plunger from the outlet. The control port is alternatively opened or closed by a control gate. When the control gate is in its closed position, the control port is closed. Some fluid flows on either side of the plunger. The pressure at the outlet is approximately atmospheric, but the pressure on the other side of the plunger is higher. The high pressure urges the plunger against the seat. If the control port is open, pressure on that side of the plunger drops significantly. The high pressure at the inlet develops a resultant force across the plunger and urges it away from the seat. Fluid then flows directly from the inlet to the outlet. When the control port is again closed, pressure rapidly builds up on the other side of the plunger from the outlet causing the plunger to move against the seat, which closes the valve.

For very high pressure systems, the just-described valve can be used in a series arrangement. That is, the valve that was just described can be used to open and close the control port. A very low force valve is used to actuate the smaller valve, and it in turn acts as a control port valve for the main valve.

The present invention also discloses a mechanical system controlling the simultaneous opening and closing of two valves.

BRIEF DESCRIPTION OF THE DRAWINGS

FIG. 3 is a side elevation, partially in section and partially schematic, showing two valves of the present invention that open and close simultaneously.

FIG. 4 is a front, partial section view taken through plane 4—4 in FIG. 3.

FIG. 5 is a side sectional view showing a modification to the actuator of the two valve system to enable the valves to be electrically operated.

DETAILED DESCRIPTION OF THE PREFERRED EMBODIMENTS

Figure 1:
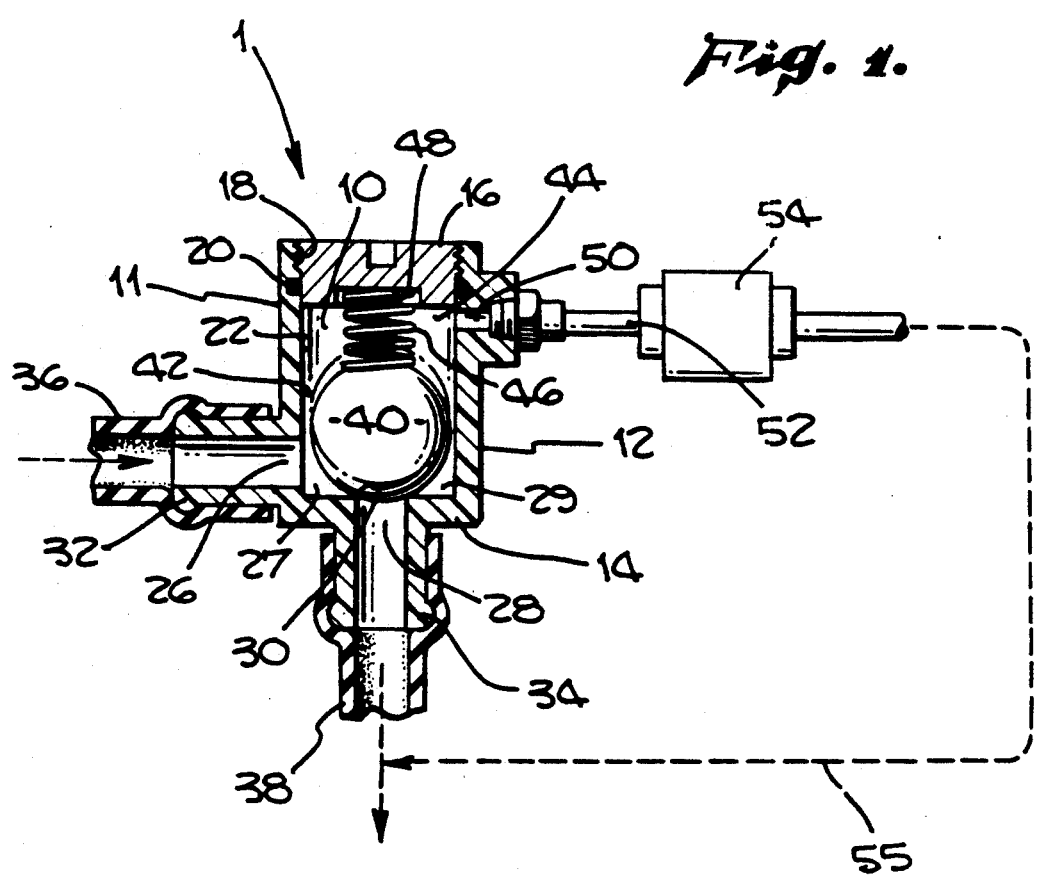
FIG. 1 is a front elevation, partially in section, of the quick opening and closing valve of the present invention.

The quick opening and closing valve 1 of the present invention comprises a main chamber 10. In the exemplary embodiment, chamber 10 is formed in an injection molded plastic housing 11. Upright wall 12 of housing 11 has a circular cross-section in the exemplary embodiment, but other shapes are also acceptable with modifications to the other parts. Housing 11 also has a bottom wall 14 and a top wall in the form of a removable cap 16. The cap is threaded into mating threads 18 on the inside of cylindrical upright wall 12 of chamber 10. A gasket or O-ring 20 seals the cap to the cylindrical upright wall. The inside surface 22 of upright wall 12 is smooth. Cylindrical wall 12 and top and bottom walls 16 and 14 form chamber 10.

An inlet 26 extends through cylindrical wall 12 into the bottom portion of the chamber 10. Likewise, an outlet 28 extends through bottom wall 14 into chamber 10. The shape of the opening of outlet 28 through bottom wall 14 creates a seat 30. In the FIG. 1 embodiment, side wall 12 makes a relatively sharp angle with bottom wall 14, thus creating defined spaces 27 and 29.

An inlet nipple 32 and an outlet nipple 34 extend outward from the chamber at inlet 26 and outlet 28, respectively. Flexible tubing 36 and 38 attach to nipples 32 and 34. The flexible tubing-nipple arrangement shown in FIG. 1 is illustrative only, If the value is used in a beverage dispenser, flexible tubing 36 and 38 may be replaced with another type of conduit which is attached in a manner that makes removal and leaking less likely.

The valve of the present invention also has a plunger movable within the chamber. In the exemplary embodiment, the plunger is a sphere or ball 40. A stainless steel sphere 40 is used as the plunger in the exemplary embodiment. With modifications, other types of plungers could be used. The diameter of ball 40 is less than the inside diameter of upright wall 12. These dimensions create a space 42 between inside surface 22 and ball 40. The space permits fluid flowing into inlet 26 to leak past ball 40 into the upper portion 44 of chamber 10. The size of space 42 has an effect on the operation of the ball in a manner discussed below.

Ball 40 moves between two positions. When the ball is in the closed position (solid lines in FIG. 1), the bottom part of the ball rests on seat 30. In that position, fluid does not flow from inlet 26 to outlet 28. The intersection of ball 40 and seat 30 blocks the fluid flow out of the outlet. Ball 40 has an open position (phantom in FIG. 1) in which the ball no longer engages seat 30.

When the ball is in the open position, inlet 26 communicates directly with outlet 28 beneath a portion of ball 40 so that fluid flows directly from the inlet through the outlet.

The top of an optional low-force spring 46 seats in notch 48, and the bottom of spring 46 contacts ball 40. The low-force spring provides a small but sufficient force so that the ball normally rests on seat 30. The force from spring 46 retains ball 40 in its closed position at very low inlet pressures. If the valve is inverted, the spring prevents the force of gravity from pushing the ball away from the seat.

A control port extends into the chamber on the side of the plunger opposite the outlet. As the exemplary embodiment of FIG. 1 shows, the control port 50 extends through chamber wall 12 and provides fluid communication between the upper portion 44 of the chamber and conduit 52.

The cross-sectional area of control port 50 should be larger than the cross-sectional area of the space 42 between ball 40 and inner surface 22 of cylindrical wall 12, but substantially less than the areas of inlet 26 or outlet 28. Therefore, the force required to open and close control port 50 via control valve 54 is very low. The control valve opens or closes under mechanical or electrical control.

When control valve 54 is closed, fluid in upper portion 44 of chamber 10 cannot flow through control port 50. Pressure at inlet 26 is transferred via space 42 to upper chamber 44 and the upper side of ball 40. The lower side of ball 40 and outlet port 30 is downstream and at less pressure than that on the upper side of the ball. This pressure difference forces ball 40 to remain in the closed position, therefore allowing no transfer of fluid through the valve. All parts of the value upstream of seat 30 are at inlet pressure when the valve is in the closed position.

When control valve 54 is opened, fluid flows from inlet port 26, through space 42, into chamber 44 and out control port 50. The fluid flow through space 42 causes sufficient pressure drop across ball 40 and urges it upward into chamber 44, which opens outlet seat 30. As the ball moves away from seat 30 the lower side of ball 40 moves into the higher upstream pressure of inlet 26, thereby causing even greater pressure difference across the ball. The ball accelerates toward the full open position.

When control valve 54 is closed, fluid ceases to flow through control port 50 and space 42. Therefore, with near zero pressure drop across space 42, the pressure in chamber 44 increases to the upstream pressure of inlet 26. The downstream or lower pressure at outlet seat 30 and the upstream pressure in chamber 44 develops a pressure difference across ball 40 that urges it toward seat 30, therefore closing the valve. As the ball 40 moves toward seat 30, the downstream pressure at the seat 30 develops an ever decreasing pressure on the lower side of the ball. Likewise, the pressure in upper chamber 44 increases to the upstream pressure at inlet 26, thereby developing an ever increasing pressure across ball 40.

Both when the ball moves upward or downward, the resultant forces on the ball change very quickly. The forces serve to accelerate the ball in the desired direction. Therefore, the valve snaps open and snaps closed. This is a most desirable result.

The portion 55 of conduit 52 past control valve 54 attaches to tubing 38 downstream from outlet 28 so that any fluid that flows through outlet port 50 is used by the system.

Normal fluid control systems have conflicting goals. Maximizing the area of the conduit minimizes the pressure drop, and elevating pressure maximizes flow. High pressure and large diameter tubing increases the size and power input necessary for the valves to open and close the conduit, however. No matter how fast valve parts move, it takes longer to open or close larger diameter tubes. More force must be generated to overcome higher fluid pressures.

As previously discussed, conduit 52 has a relatively small diameter, which is substantially smaller than the diameter of inlet 26 or outlet 28. Therefore, the force of the fluid (pressure times area) is much less in conduit 52 than it is in inlet 32. A relatively low powered valve can open and close quickly because it does not have to overcome large forces. The beverage dispenser of the present invention preferably uses a low powered but fast acting gate valve. Gate valve 54, which opens and closes conduit 52, can be relatively small and low powered but still be very fast acting. The low mass and size of the valve and principal of operation greatly increases the speed, especially when compared to equivalent solenoid valves. Therefore, the present invention uses a small, low powered and rapidly activated valve on a low force, small diameter line as a way of controlling higher forces of the substantially larger diameter conduit.

The speed with which the ball 40 moves depends primarily upon the size of outlet port 28, the mass and size of the ball, the distance that the ball travels, the area of space 42, and the input pressure at inlet 26. The speed of the ball 40 increases as pressure at inlet 26 increases. This feature results in approximately the same volume of fluid being transferred during opening and closing times regardless of inlet pressure. Errors in soda to syrup ratios during switching times are substantially reduced as a result.

Inlet 26 and control port 50 are shown on opposite sides of upright wall 12, but the positions shown in FIG. 1 are exemplary only. The inlet should be at the bottom position near bottom wall 14. The control port should be high enough in chamber 10 so that ball 40 does not interfere with the control port 50. Outlet 28 extends through bottom wall 14 at a right angle to inlet 26. It is also important if the valve is to open and close very quickly, that spaces 27 and 29 be provided. Of course, spaces 27 and 29 are really part of the same space extending around the ball. Space 27 is designated as a separate space because it is the space at the chamber end of inlet 26. Cylindrical wall 12 does not curve around ball 40 but meets bottom wall 14 at a generally right angle.

Figure 2:
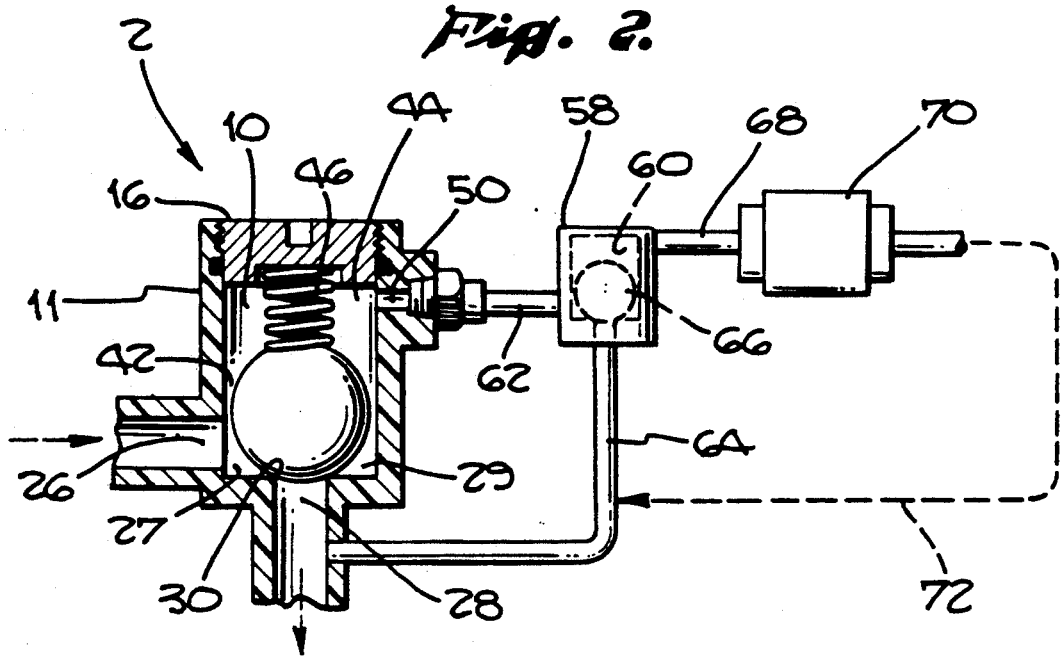
FIG. 2 is a front elevation, also partially in section, showing a modified version of the quick opening and closing valve of the present invention.

The valve 2 in the FIG. 2 embodiment is used for higher flow rates and low flowing pressure losses. Essentially, main chamber 10 in FIG. 2 and the structure associated with it is the same as in FIG. 1. That is, a plunger in the form of ball 40 moves from a closed position (shown in FIG. 2) in which the ball is positioned on seat 30 to block flow inlet 26 to outlet 28. The valve at control port 50, which controls the position of ball 40, is itself controlled by a smaller version 58 of the same valve. Valve 58 in FIG. 2 performs the same function that gate valve 54 of FIG. 1 performed. That is, fluid flow from control port 50 passes into conduit 62, which becomes the inlet of chamber 60 of valve 58. A plunger in the form of ball 66 in its closed position seats on outlet 64. The ball is in its closed position because of back pressure in control port 68 acting downward on ball 66 when gate valve 70 is closed. When gate valve 70 is opened, fluid that leaks past ball 66 flows past valve 70 relieving the pressure above the ball and allowing fluid to flow directly from inlet 62 to outlet 64.

The fluid flow through outlet 64 returns to outlet 28 of principal valve 2. Likewise, the fluid passing valve 70 returns through line 72 either to outlet conduit 64 (as shown) or directly to main outlet 28.

FIGS. 3, 4 and 5 show how two valves of the present invention can be incorporated into a system for dispensing more than one fluid.

The system in FIG. 3 has two principal valves 110 and 112. One of the valves controls the flow of carbonated water and the other controls the flow of syrup. Each valve has an inlet, 114 and 116, which correspond with inlet 26 in FIG. 1. Each valve 110 and 112 also has an outlet 118 and 120 which corresponds with outlet 28 in FIG. 1. The inlet and outlet of each valve communicates with a main chamber 122 and 124 (shown schematically). Each chamber also has a plunger (not shown) that operates as the plunger in FIG. 1 operates. Control channels 126 and 128 lead from the control port 130 and 132. Again, the control channels are very small compared to the size of inlets 114 and 116 and outlets 118 and 120.

Control channels 126 and 128 are opened and closed by means of needle valves 134 and 136. In the exemplary embodiment, needle valves 134 and 136 are flexible and formed of silicon rubber. Each needle valve has a conical end 138 and 140 that seats in the respective control channel 126, 128. The opposite ends 142, 144 of needle valves 134, 136 rest against a leaf spring 146 (see FIG. 4 also). As FIG. 3 shows, leaf spring 146 maintains needle valves 134, 136 in normally closed positions.

Channels 126 and 128 could connect with each other and be controlled by a single valve. This design is not preferable in a beverage dispenser for two reasons. First, having two channels allows each valve to be self-contained. Second, the fluids that each valve controls are kept apart until they reach the mixing portion of the beverage dispenser. If control channels 126 and 128 met, some mixing of the two fluids would take place in the combined conduit.

The FIG. 3 embodiment is manually activated. Lever 148, which is within reach of an operator, pivots about shaft 152 that is mounted on a beverage dispenser. The left end (FIG. 3) of lever 148 has an opening 149, and the top portion of vertical pin 150 extends through the opening. There is no direct contact between lever 148 and pin 150. Therefore, movement of lever 148 does not directly move pin 150. Stop member 155 is fixed to pin 150. A helical spring 156 is around the upper portion of pin 150 between the bottom of the left hand side of lever 148 and the top of stop member 155. The other end of pin 150 contacts leaf spring 146. In its normal position (FIG. 4), the leaf spring maintains pin 150 in an upward position and holds needle valves 134 and 136 in their respective control ports.

When the operator urges the right hand side of lever 148 in the direction of arrow 157, the left hand side of lever 148 moves downward (FIG. 3) relative to pin 150. This downward movement compresses spring 156 and the spring applies a downward force on stop member 155. When the downward force from lever 148, spring 156 and stop member 155 acting on pin 150 exceeds the force necessary to overcome the force from leaf spring 146, the leaf spring snaps down to its open position and releases needle valves 134 and 136 to their open positions. Note that the leaf spring is mounted above a recess 158 to allow the leaf spring to snap to an over-center configuration.

The use of an intermediate spring 156 to convey the force from lever 148 to pin 150 prevents an operator from teasing pin 150 and depressing but not snapping leaf spring 146. This linkage, therefore, ensures that needle valves 134 and 136 should open or close rapidly, which in turn ensures that the balls in main valves 110 and 112 (not shown) snap open and closed rapidly.

Automated dispensers use an electromagnet to activate the valves. For example, in the FIG. 5 embodiment, a remotely controlled solenoid 160 provides electrical activation. Stop washer 162 is fixed on rod 163. For optional manual operation, a push button 166 may extend through the front panel (not shown) of the beverage dispenser. Alternatively, a lever such as lever 148 in FIG. 3 could be provided.

Solenoid 160 acts on plate 162 to depress rod 163. Rod 163 extends through plate 168 where it depresses member 170 on the other side of plate 168. Member 170 has an opening 172 which receives the top portion of rod 164. When rod 163 is depressed manually or electrically, member 170 does not make contact with rod 164. Instead, the bottom 174 of member 170 pushes spring 176 downward where it applies a force on stop member 178, which is fixed to rod 164. Bottom 174 of member 170 may have a short shoulder 180 to prevent spring 176 from slipping off the bottom of member 170. Member 170 compresses spring 176, which pushes stop member 178 and rod 164. As in FIG. 3, rod 164 connects to leaf spring 146 (not shown in FIG. 5), which in turn controls the needle valves.

The electromagnet 160 is designed to be either fully activated or fully deactivated. Therefore, if the electromagnet is deactivated, rod 164 is up, in which case leaf spring 146 (FIG. 3) holds needle valves 134 and 136 closed in outlet ports 126 and 128. When electromagnet 160 is fully activated, rod 163 collapses leaf spring 146 to release the needle valves.

The electromagnet is most often controlled by some type of measuring device, often a timer. If the flow rate through the beverage dispenser is three ounces per second and the operator pushes a button for a six ounce beverage, a timer activates the electromagnet for two seconds, down until it pushes the leaf spring down to release the needle valves.

The arrangement of member 170 acting on spring 174 of FIG. 5 is designed primarily to insure that in manual operation, rod 164 is either fully depressed or fully withdrawn. Unless member 170 exerts enough force on spring 176 to overcome the counter forces from leaf spring 146, one pushing on button 166 will push with no opening of the valve. The valve will not tease.

The valve of the present invention has been shown in embodiments primarily for use in beverage dispensers. With modifications, the valves may be used for controlling other fluids, and they may be used in multiples for the control of more than one fluid simultaneously. Various modifications are also possible, especially to accommodate different flow rates and pressures.

I claim:

1. A system for dispensing multiple fluids comprising at least two valves alternatively permitting or stopping the flow of fluid, each valve comprising:
   a. a chamber having chamber side walls, a primary inlet connected to a source of fluid and extending through a chamber wall into the chamber, and a primary outlet extending through a chamber wall out of the chamber, and a seat at the intersection of the outlet and the chamber;
   b. a plunger in the chamber movable from a closed position against the seat to an open position spaced from the seat, the inlet being in fluid communication with the outlet when the plunger is in the open position;
   c. a control port extending through a chamber wall on the other side of the plunger from the outlet, a control gate having an open condition allowing fluid to pass through the control port and a closed condition blocking the passage of fluid through the control port;
   d. wherein each control gate comprises a needle insertable into the control port and a linkage member linking the needles together in contact with the linkage and wherein the linkage member comprises a leaf spring, the leaf spring being in contact with the needle valves and urging the needle valves into the respective control port; and
   e. an actuator contacting the leaf spring and urging when actuated the leaf spring to a position releasing the needle valves from their respective control ports.

2. A system for dispensing multiple fluids comprising at least two valves alternatively permitting or stopping the flow of fluid, each valve comprising:
   a. a chamber having chamber side walls and a base and having a first portion adjacent the base and a second portion spaced from the base, a primary inlet connected to a source of fluid and extending through a chamber side wall into the chamber, and a primary outlet extending through the base out of the chamber, and a seat in the base of the chamber;
   b. a generally spherical member in the chamber movable toward and away from the base from a closed position against the seat to an open position spaced from the seat, the inlet being in fluid communication with the outlet when the spherical member is in the open position; and
   c. a control port extending through a chamber side wall on the other side of the spherical member from the outlet, a control gate having an open condition allowing fluid to pass through the control port and a closed condition blocking the passage of fluid through the control port;

the system further comprising an actuator connecting the control gates of each valve together and moving the control gates simultaneously between their respective open and closed conditions.

* * * * *